(12) United States Patent
Van Gorder

(10) Patent No.: X7365
(45) Date of Patent: Jan. 7, 1833

(54) WHEELS, FOR CARRIAGES

(76) Inventor: Isaac Van Gorder

Isaac Van Gorder of Warren Ohio
Letters Patent

The Schedule referred to in these Letters Patent and making part of the same
containing a description in the words of the said Isaac Van Gorder himself of
his improvement in the construction of Wheels for Wagons and Carriages To all to whom these presents shall come, Be it known that I, Isaac
Van Gorder of Warren in the County of Trumbull and State of Ohio have
invented a new and useful improvement in the manner of constructing
wheels for wagons and Carriages and that the following is a full and exact
description of the construction and operation of said improvement as inven-
ted by me, to wit. The hub or nave of the wheel is made of Cast iron,
and for a two horse carriage the diameter of the hub for the hind wheel
is six and a half inches, with mortices for sixteen spokes, and that of the
hub for the fore wheel, six inches, with fourteen mortises. the thickness
(or that which in the common hub would be termed the length) of the hub is
two and one fourth inches at the outer edge and three inches at the centre;
the size of the mortises for the spokes is sufficient to admit a tenon of one
and three fourths inch wide and three fourths of an inch in thickness. thro'
the centre of the hub is a round tapering hole of one and one fourth inch
diameter at the outer end of the hub.. and two inches at the inner end, into
this hole in the hub is inserted the end of an axle, or journal made of cast
or wrought iron and made tapering so as exactly to fill the hole thro' the
hub the axle is made fast by means of a screw bolt inserted into the end
of the axle at the outer end of the hub, on which bolt is a head eight
square of one and three fourths inch diameter resting against the outer end
of the hub. The axle passes from the hub under the axletree bed and
plays in two boxes of cast iron which boxes are made fast to the under
side of the axletree bed by means of stirrups passing over the axletree bed
with screw [illegible] at their lower ends. The box next to the end of the axle
tree bed is two and one fourth inches thick by two and a half inches wide
[illegible] fastened on the wide ways of the box up and down. The length of the
box is three and a half inches on the top edge, and two inches on the lower edge On the top edge of the box at each corner and running lengthways of the
box is a flange or projecting lip of about 3/8 of an inch wide the whole length
of the box. and likewise on the centre of the upper edge of the box is a
tongue rising to the same height and running in the same direction with
the lips at the edges (the tongue is half an inch wide) these are bedded
into the under side of the axletree but to keep the box firm to its place;
A round hole of one and three fourths inch diameter is made thro'
the box lengthways. in which the axle runs.
A plate of iron four inches long two inches wide and of suitable thick
ness with a hole thro at each end runs across under the box; thro which
plate the lower ends of the stirrup pass on which there is a screw,
with a burr at the under side of the plate by means of which the plate
is pressed hard against the under edge of the box to keep it tight to the
underside of the axletree. The box farthest from the hub is made two
pieces of cast iron about four inches long and an inch and a half wide.
The top piece is 5/8 of an inch thick and the lower piece 3/8 thick —
the lower piece is made with a crease in the middle: the other with a hollow
on one side and a square projection on the opposite side. the pieces are
made in such a manner that when laid together with the hollowing sides
next to each other a round hole is formed between them one and [illegible] inch
diameter in which the inner end of the axle plays.
These pieces have holes thro the ends and are fastened to the axletree bed in
the same manner as the iron plate mentioned in the description of the
other box. the square projection on the top piece as mentioned before is
bedded in the wood above to keep it steady to its place
The axle is of cast or wrought iron; the length to be determined by the width
of the carriage, it is intended that when the carriage is put together the
inner ends of the axles will run within four inches of each other; so that
for a carriage or wagon of five feet track; the length of the axles will be
about two feet four inches including that part which goes thro the hub,
The axle is round and tapering growing smaller from the hub towards the
inner end that part which goes into the hub has been already described
the diameter of the axle where it runs in the outside box is one & three fourths inch being one fourth of an inch less than its diameter at the end of the hub
which leaves a square shoulder on the axle close to the inner end of the hub,
this shoulder works against the box and prevents the wheel from pressing in-
ward when in motion. The diameter of the axle where it runs in the inner
box is one and one eighth inches. On the extreme inner end of the axle is a collar
about 3/8 of an inch wide rising about a quarter of an inch above the cir-
cumference of the axle where it passes thro' the inner box. the shoulder
of this collar works against the inner edge of the box to prevent the
wheel from drawing outwards when in motion. When a wrought iron
axle is used, the end which goes into the hub, will extend thro the hub
about an inch on the outside, with a screw cut on the end, and a burr
to screw up against the end of the hub. the other end of the axle will
likewise have a screw and burr with a washer (in the room of the
collar as described in the cast axle) to work against the inner edge
of the box. (In the room of the inside box as above described may
be substituted a bolt of wrought iron passing up thro the axletree bed
with an eye on the lower end and a burr on the top. The axletree bed
to be made the same as when the common iron axletree is used.
The spokes, and fellows, and the rest of the running work to be made in the
usual way of making wagons, and carriages;
That which I claim in the above described machinery as new and of
my own invention, is the principle of attaching each wheel to its separate
axle or journal made fast in the hub and running the axles or journals
in boxes attached to the axletree bed.

Ex'd
H.H.

Isaac Van [illegible]

Witnesses,
M. Blanchard
David Ford (1321 [illegible])

(Granted January 7. 1833) 15 [illegible]